Nov. 6, 1956
S. KRASNOW
2,769,920
RADIOACTIVITY RESPONSIVE SYSTEMS FOR USE IN BOREHOLES
Original Filed July 24, 1942
2 Sheets-Sheet 1
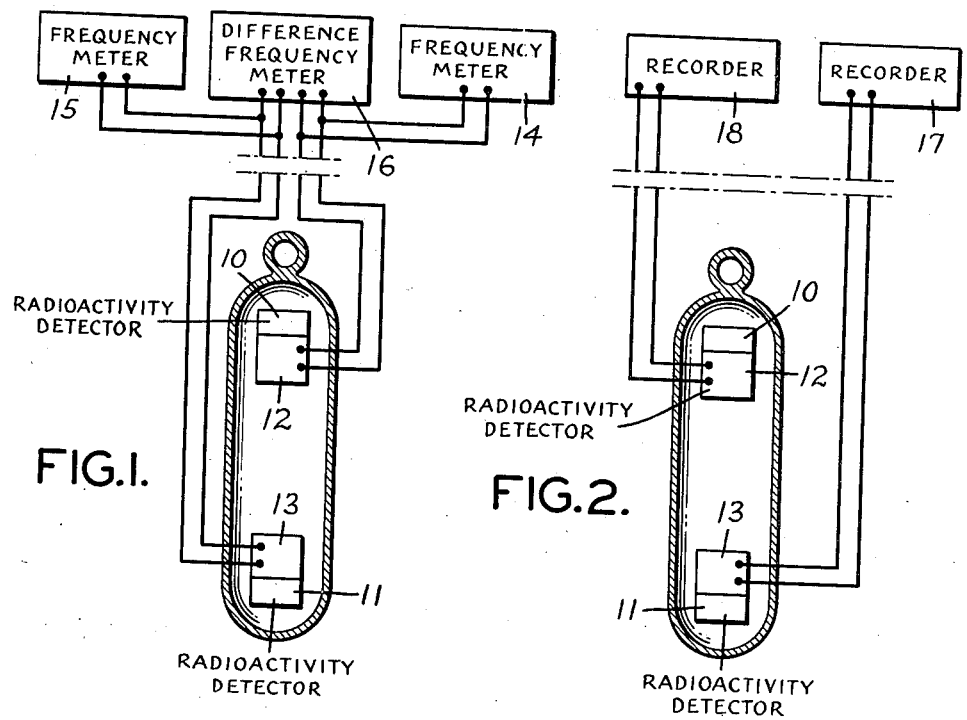
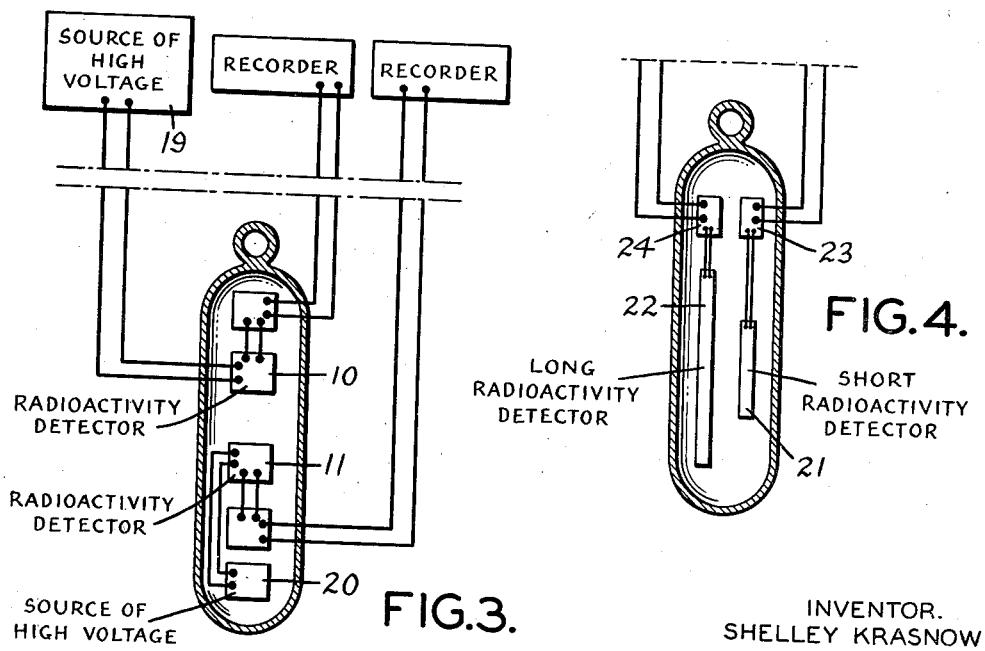
INVENTOR.
SHELLEY KRASNOW
BY Campbell, Brumbaugh, Free & Graves
HIS ATTORNEYS.

Nov. 6, 1956 S. KRASNOW 2,769,920
RADIOACTIVITY RESPONSIVE SYSTEMS FOR USE IN BOREHOLES
Original Filed July 24, 1942 2 Sheets-Sheet 2

INVENTOR.
SHELLEY KRASNOW
BY Campbell, Brumbaugh, Free & Graves
HIS ATTORNEYS.

United States Patent Office 2,769,920
Patented Nov. 6, 1956

2,769,920

RADIOACTIVITY RESPONSIVE SYSTEMS FOR USE IN BOREHOLES

Shelley Krasnow, Fairfax County, Va., assignor to Schlumberger Well Surveying Corporation, Houston, Tex., a corporation of Delaware Original application July 24, 1942, Serial No. 452,228, now Patent No. 2,590,874, dated April 1, 1952. Divided and this application February 27, 1952, Serial No. 273,751

13 Claims. (Cl. 250—83.6)

This invention relates to an improved method and apparatus for measuring radioactivity, and has particular reference to a method and apparatus for measuring radioactivity in inaccessible locations, such as in bore holes or at considerable depths in bodies of water.

This application is a division of copending application Serial No. 452,228, filed July 24, 1942, by Shelley Krasnow and Leon F. Curtiss, for "Multiple Element Radioactive Ray Recordings," (issued on April 1, 1952 as U. S. Patent No. 2,590,874) which, in turn, is a continuation-in-part of copending application Serial No. 301,078, filed October 24, 1939, by the same applicants, for "Method and Apparatus for Measuring Radioactivity" (issued on April 1, 1952 as U. S. Patent No. 2,590,873).

One object of the invention is to provide a method and apparatus useful for locating deposits of minerals having radioactive properties. Another object of the invention is to provide an apparatus by which one may measure radioactive properties continuously from the top to the bottom of a bore hole, and have both an immediate indication, and a permanent record, of the radioactivity at various depths.

In locating deposits of radioactive minerals, it is often the custom to drill a number of bore holes in localities where such deposits might exist. It is further the practice to bring samples or cores of the drilled material to the surface of the earth, and there examine them for radioactivity by well known methods and apparatus. This method has several drawbacks. First, a deposit of ore may exist close to the bore hole, but not be traversed by it, by which the deposit will be missed. Second, it is possible to make an error in ascertaining the exact depth from which a core or sample has been taken. Finally, it is rarely possible to bring all of the core to the surface, a certain percentage always being lost in the drilling or handling.

It is further known that deposits of petroleum are often markedly radioactive as compared with the surrounding rock material. This is believed to be due to the superior absorptive property of petroleum for radium emanation. Natural gas and ground water are also known to be somewhat more radioactive than their surrounding rock material. In drilling for either petroleum or natural gas, or ground water, it is desirable to know the exact level at which the strata having these are traversed by the drilled hole. This is often difficult to determine, particularly when drilling has been done by the "rotary" method, in which the use of mud under pressure tends to wall off the strata. Often, too, the drilled hole will be lined with a metallic casing, which casing by accident or intention may seal off strata having the desired fluid.

It is the intention in the present invention to provide an apparatus so sensitive, and a method appropriate to its use, that the relatively faint radioactivity of oil and ground water may be detected in place in a bore hole. An apparatus sensitive enough to serve this function will by its nature differentiate between the different though faint radioactivities of the rock material. Rock materials, dependent upon their origin and dependent upon the minerals contained in them, have different radioactivities. Thus, it has been found that granite, shales having organic materials embodied therein, sedimentary rocks containing zircon, and rock materials having mica associated with them, are all slightly more radioactive than, for example, limestone or chalk deposits. Sandstones will differ in their natural radioactivity, depending upon the minerals contaminating them. Organic deposits, such as coal, oil and natural gas, as mentioned above, petrified vegetable matter, etc., will show higher radioactivities than for instance limestone and chalk. Thus, with an apparatus as sensitive as that descibed herein it will be possible to differentiate between different layers of rock by the differences in their radioactivities. Each layer in an area will have a characteristic radioactivity, just as it has a characteristic chemical composition, and for the same reason. Thus, the radioactivity of a layer will serve as a variety of marker, serving to identify the layer wherever it might be in an area.

It thus becomes possible to identify rock layers in different bore holes drilled in an area and thus correlate the strata.

Further objects of the invention described are to obviate the difficulties mentioned and secure the advantages mentioned above.

Reference is had to the accompanying drawings in which:

Fig. 1 is a schematic diagram of multiple detector apparatus constructed according to the invention for obtaining indications of radioactivity in a bore hole;

Fig. 2 illustrates schematically a modification in which the responses of a plurality of detectors in the bore hole are separately recorded at the surface;

Fig. 3 shows a modification of Fig. 2 in which the detectors in the bore hole apparatus are energized by high voltage sources located in the bore hole apparatus and at the surface of the earth, respectively;

Fig. 4 illustrates schematically another embodiment utilizing long and short radioactivity detectors;

Figure 5:
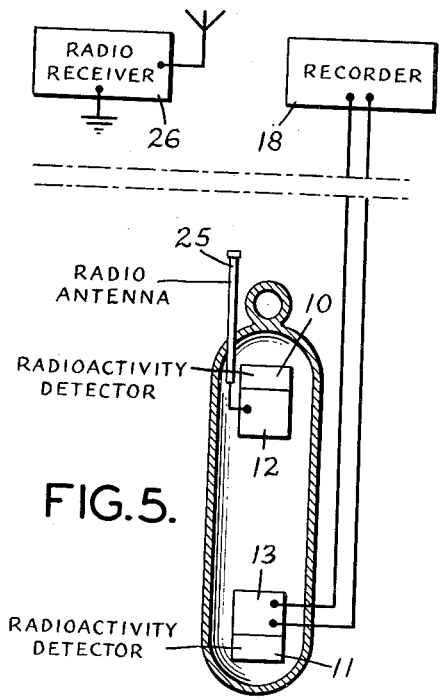
Fig. 5 illustrates schematically a modification of the invention in which the response of one of the detectors is transmitted to the surface through conductors while radio transmission is used to convey the response of a second detector to the surface.

Fig. 1 shows an apparatus which may be utilized to measure what may be termed the radioactivity gradient along the length of a bore hole. This apparatus is comprised of elements such as as shown in Fig. 10 of the above identified copending application Serial No. 452,228, in duplicate, and mounted at a substantial axial distance from each other. Each of the units 10 and 11 is connected to its associated measuring circuit 12 and 13, respectively, the outputs of the two circuits being each connected to separate frequency measuring systems 14 and 15, respectively, at the surface of the ground. The two frequency measuring systems may be interconnected so as to superpose one frequency on the other and give the difference of the two frequencies on a difference frequency meter 16 as a result. In this way a measure will be obtained of the relative radioactivity of the rock materials at the respective levels of each of the ionization chambers 10 and 11. Thus the gradient of rate of change of radioactivity may be detected.

One of the conventional concepts here involved is that of utilizing plural elements which may be lowered as a unit, and which will furnish simultaneous responses. A number of useful modifications may be constructed utilizing this principle. A number of representative modifications are given below, it being understood that these are not limiting but rather exemplary. Thus, advantage may be taken of the different behavior of different types of radioactive measuring elements. For example, the element 10 in Fig. 2 may be a Geiger-Muller counter with the proper associated circuit 12, while the other element 11 may be an ionization chamber with the proper associated circuit 13. The responses from each of the members 10 and 11 may be transmitted separately to the surface of the earth and there recorded in correlation with depth by conventional recorders 17 and 18. Although both pieces of apparatus mentioned are subject to extraneous disturbances, in general disturbances will not occur at the same time nor will they be of the same nature or pattern. Thus, only those responses which are common to both members need be recognized.

Similarly, the detectors 10 and 11 may be a Geiger-Muller counter and an ionization chamber, respectively, one apparatus housing utilizing high voltage fed from a suitable source 19 at the surface of the earth, and the other utilizing high voltage supplied by a suitable source 20 in the bore hole apparatus, such as a group of batteries, for example, as shown in Fig. 3. Alternatively, the detectors 10 and 11 may both be Geiger-Muller counters or ionization chambers, one of the two operating from voltages supplied from the surface of the earth.

Still further, plural elements may be utilized, one type of circuit being utilized for one element, and another type of circuit being utilized for the other. Thus, one circuit may be responsive, for instance, to temperature and may have temperature enter as a factor in the results. The other circuit may be responsive, for instance, to vibration and have the effects thereof enter as a factor into the results. The use of both circuits simultaneously allows one to correct or compensate for that portion of a record obtained under adverse conditions for a given circuit, having at all times a usable record from at least one circuit or the other. It will be obvious that the probability of the same disturbance arising in both circuits to the same extent due to different causes is exceedingly small, so small that in practice it may be neglected.

Still another use which may be made of plural elements would involve the conjoint use of short and of long elements 21 and 22, respectively, sensitive to radioactivity, mounted adjacent each other as shown in Fig. 4, and provided with separate amplifying means 23 and 24, respectively, the outputs of which may be transmitted through conductors to suitable recording means at the surface of the earth. The short element 21 (either a Geiger-Muller counter or an ionization chamber) will distinguish thin layers readily, but is not very efficient for the rapid logging of relatively weak formations. On the other hand, the long counter 22 is less capable of discriminating and resolving thin layers while acting efficiently for rapid logging of weak formations. The use of the two elements 21 and 22 operating and recording simultaneously allows one to operate rapidly for certain portions of a bore hole, and to slow down operations for other portions. In the first case, the responses from the large measuring element 22 would be given chief attention, while in the latter case the small element 21 would enable one to indicate the position of a layer with greater accuracy.

The modification of Fig. 4 is also highly useful for the location of radioactive markers, whether natural or artificial. The large measuring element 22 may be utilized while lowering the apparatus rapidly, to find the approximate positions of the radioactive markers. Such an element, being larger, will in general be more sensitive and can detect the marker at a greater distance and with a greater speed of lowering. Once the approximate position has been obtained, the small element 21 can be used to locate the position of the marker with certainty.

It is understood that when large and small elements are referred to, they may be different as to diameter or different as to length or both, or they may have differences in their physical structure which will cause them to act, respectively, as large or small elements, or the two elements may be different, one having a greater sensitivity of response than the other, due to treatment of the active surfaces, the circuit involved, etc.

Any one of the measuring system shown in the above identified copending application Serial No. 452,228 may be utilized for measuring with one element, while any of the other systems shown in that application may be utilized for the other element. For example, in Fig. 2, the detector 10 with its associated electronic circuits 12 and the recording means 18 may comprise a system of the type shown in Fig. 1 of said copending application Serial No. 452,228, while the detector 11 with its associated electronic circuits 13 and recording means 17 may be of the type shown in Fig. 11 of that application in which the frequency of an oscillating wave is modulated as a function of the response of a radioactivity detector.

If desired, the modulated oscillating wave representing the output of the detector 10 may be transmitted to the surface of the earth by radio transmission, as shown in Fig. 5 instead of by conductor means, as in Fig. 2. In Fig. 5, the detector 10 is provided with suitable means 12 for generating a modulated radio frequency wave which is adapted to be fed to suitable antenna means 25 for propagation through the bore hole to receiver means 26 located at the surface of the earth. This portion of the system may be similar to that shown in Fig. 2 of the copending application Serial No. 223,092, filed March 21, 1951, for "Bore Hole Radioactivity Systems Utilizing Radio Signal Transmission."

Figure 6:
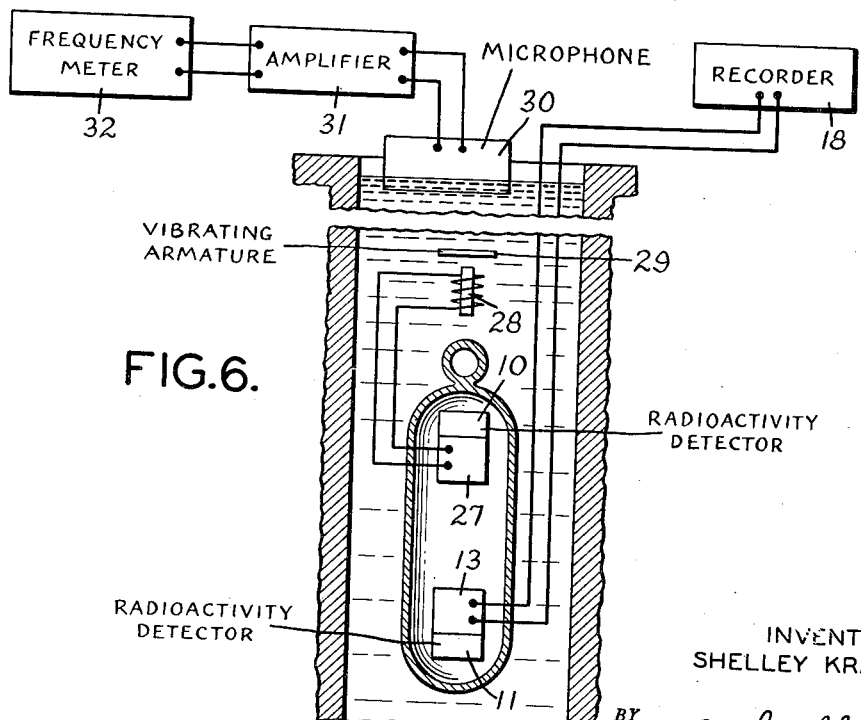
Fig. 6 is a schematic diagram of a further modification in which acoustic wave transmission is employed instead of radio waves for conveying the response of one of the detectors to the surface.

Also, acoustic wave transmission may be employed in place of radio wave transmission for conveying the responses of one of the detectors to the surface, as shown in Fig. 6. Thus, the output of the detector 10 may be fed to apparatus 27 of the type shown by the combined showing of Fig. 4, and Fig. 6 of the aforementioned copending application Serial No. 301,078, for modulating an oscillating wave as a function of the response of the detector 10. The output of the apparatus 27 may be fed to an electromagnet 28 to produce a corresponding vibration in a vibrating armature 29. The mechanical vibrations of the armature 29 are transmitted to the surface of the earth where they can be detected by a detector device such as a microphone 30, an amplifier 31 and a suitable frequency meter 32.

Figure 7:
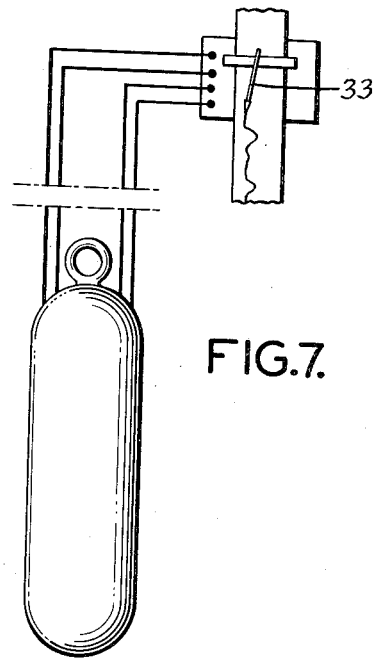
Fig. 7 is a schematic diagram of multiple detector radioactivity logging apparatus together with means at the surface of the earth for recording the composite response of the two detectors.

It will be understood that each measuring element may furnish a separate trace on a chart, produced either photographically or with a pen, the chart being desirably a single one whose movement is proportional to the position of a measuring sheave. The responses from both members may, however, be fed into a single recording galvanometer or pen recorder 33, which will then give the same responses from the members as shown in Fig. 7. Thus, one obtains a record which is automatically made proportional to the average integrated responses from the members.

It will be apparent that the several embodiments described above and illustrated in the drawings are susceptible of modification within the spirit of the invention. Therefore, those embodiments are to be regarded only as illustrative of the invention and not as limiting the scope of the appended claims.

I claim:

1. In a method of investigating radioactivity in a bore hole drilled into the earth, the steps of simultaneously lowering into the bore hole a plurality of longitudinally spaced apart radioactivity responsive devices having substantially the same radioactivity response characteristics and each manifesting its radioactivity response in the form of an electric signal, exposing said devices to radioactivity in the bore hole so as to cause them to respond significantly thereto, combining together the electric signals manifested by said devices as results of said responses and registering said combined signals in a mode exhibiting a function of a combination of the responses of said devices.

2. The combination of method steps described in claim 1 in which a function of the difference of the responses of the radioactivity responsive devices is exhibited.

3. In apparatus for investigating radioactivity in a bore hole, the combination of a pair of like radiation responsive devices mounted for movement through the bore hole in fixed longitudinally spaced apart relation to one another and each manifesting its radioactivity response in the form of an electric signal, means for combining together in circuit the electric signals manifested by said devices as results of said responses, and means for registering said combined signals in a mode providing indications of a combination of the responses of said devices.

4. Apparatus as defined in claim 3 in which the combining means provides a combined signal representative of the difference between the responses of said devices, and said registering means provides indications of said difference.

5. In apparatus for investigating radioactivity in a bore hole, the combination of first radioactivity responsive means adapted to be lowered into a well, electrical conductor means for transmitting the output of said first radioactivity responsive means to the surface of the earth, second radioactivity responsive means mounted in fixed relation to said first radioactivity responsive means to be movable therewith and adapted for simultaneous operation therewith, means for generating oscillations, means for modulating a characteristic of said oscillations as a function of the output of said second radioactivity responsive means, means for transmitting said modulated oscillations to the surface of the earth, and means for exhibiting time correlated functions of the output of said first radioactivity responsive means and of a modulation component in the output of said oscillation generating means, to afford by intercomparison thereof an indication of a bore hole condition.

6. Apparatus as defined in claim 5 in which the oscillation generating means generates electrical oscillations.

7. Apparatus as defined in claim 5 in which the oscillation generating means generates electromagnetic wave oscillations.

8. Apparatus as defined in claim 5 in which the oscillation generating means generates acoustic wave oscillations.

9. In apparatus for investigating radioactivity in a bore hole, the combination of first radioactivity responsive means adapted to be lowered into a well and to provide an output of pulses having a repetition rate varying as a function of radioactivity, electrical conductor means for transmitting the output of said first radioactivity responsive means to the surface of the earth, second radioactivity responsive means mounted in fixed relation to said first radioactivity responsive means to be movable therewith and adapted for simultaneous operation therewith, means for generating oscillations, means for modulating a characteristic of said oscillations as a function of the output of said second radioactivity responsive means, means for transmitting said modulated oscillations to the surface of the earth and means for exhibiting time correlated functions of the pulse output of said first radioactivity responsive means and of a modulation component in the output of said oscillation generating means, to afford by intercomparison thereof an indication of a bore hole condition.

10. In apparatus for investigating radioactivity in a bore hole, the combination of a plurality of radioactivity responsive means having surface areas of different size so as to be sensitive in correspondingly different degrees to radioactivity, said means being mounted for movement as a unit through a bore hole, and indicating means responsive to the outputs of said radioactivity responsive means.

11. In apparatus for investigating radioactivity in a bore hole, the combination of relatively long radioactivity responsive means adapted to be lowered into a bore hole, relatively short radioactivity responsive means mounted adjacent said long radioactivity responsive means and movable therewith, said two radioactivity responsive means by virtue of their different lengths having different radioactivity responsive characteristics, and indicating means responsive to the outputs of said radioactivity responsive means.

12. In apparatus for investigating radioactivity in a bore hole, the combination of first radioactivity responsive means of given diameter corresponding to a given response characteristic adapted to be lowered into a bore hole, second radioactivity responsive means of different diameter corresponding to a different response characteristic mounted in fixed relation to said first radioactivity responsive means, and indicating means responsive to the outputs of said radio activity responsive means.

13. A method of logging a bore hole which comprises passing through said hole a pair of vertically elongated radiation detectors of different lengths corresponding to different radioactivity response characteristics, moving said detectors through at least a certain portion of the bore hole at a relatively rapid rate, moving said detectors through at least another portion of the bore hole at a slower rate, and exhibiting functions of the outputs of said detectors as they are moved through the bore hole.

References Cited in the file of this patent

UNITED STATES PATENTS

| | | |
|---|---|---|
| 1,928,969 | Kuffel | Oct. 3, 1933 |
| 2,018,080 | Martienssen | Oct. 22, 1935 |
| 2,133,776 | Bender | Oct. 18, 1938 |
| 2,190,686 | Slitchter | Feb. 20, 1940 |
| 2,197,453 | Hassler | Apr. 16, 1940 |
| 2,285,840 | Scherbatskoy | June 9, 1942 |
| 2,316,361 | Piety | Apr. 13, 1943 |
| 2,322,634 | Howell et al. | June 22, 1943 |
| 2,332,873 | Silverman | Oct. 26, 1943 |
| 2,481,014 | Herzog | Sept. 6, 1949 |